United States Patent Office 3,204,403
Patented Sept. 7, 1965

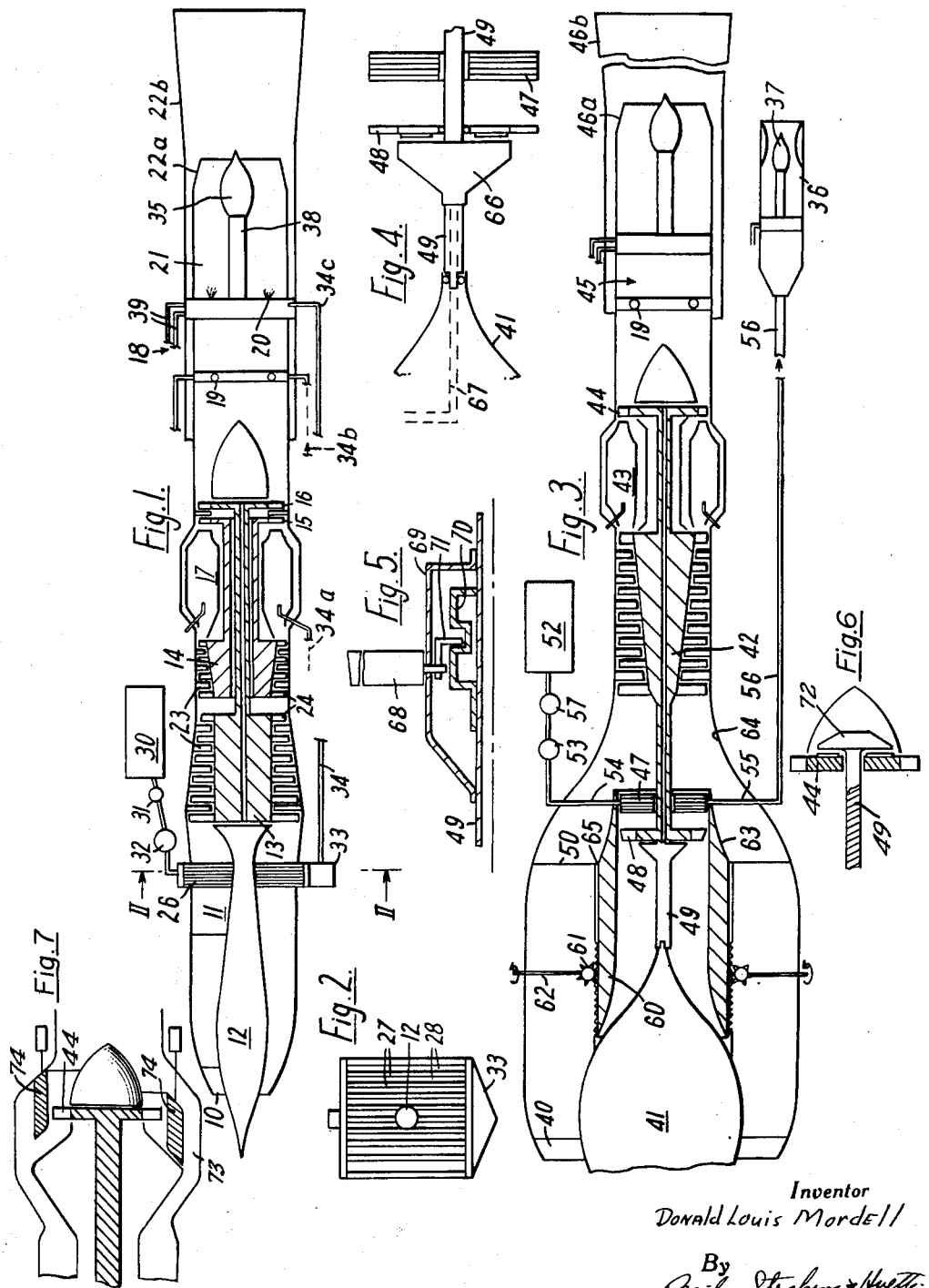

3,204,403
JET PROPULSION GAS TURBINE ENGINES WITH SELECTIVELY OPERABLE AIR COOLING MEANS
Donald Louis Mordell, Beaconsfield, Montreal, Canada, assignor to Bristol Siddeley Engines Limited, Bristol, England
Filed Apr. 5, 1963, Ser. No. 270,855
11 Claims. (Cl. 60—35.6)

This invention relates to jet propulsion gas turbine engines of the kind comprising, in connected flow sequence, a ram air intake, a multi-stage axial-flow rotary compressor system, a primary combustion system, a turbine system arranged to drive the compressor system, a jet pipe, and a propulsion nozzle. The engine preferably includes a reheat combustion system in the jet pipe.

Conventional turbojet engines of the above kind may constitute practicable propulsion units for driving aircraft and other aerial bodies at speeds up to the range Mach 2 to Mach 3. At speeds above this, the thermodynamic efficiency of the compressor suffers from the high temperature of the incoming air. Moreover the materials of the rotary compressor system may not withstand the high temperatures of the incoming air. The present invention enables an engine to operate over a subsonic-supersonic speed range the upper limit of which may be well in excess of Mach 4.

According to the invention, an engine of the above kind is provided with optionally operable means for removing heat from the air flowing from the air intake to the compressor system and for generating thrust from the removed heat.

One means which may be provided for removing heat is a heat exchanger in which air flowing from the air intake to the compressor system optionally passes in heat exchange relation with a coolant fluid together with means for expanding the heated coolant fluid or combustion products thereof in a jet propulsion nozzle.

The heated coolant fluid may be discharged either into the working fluid stream of the engine downstream of the compressor system, or through an auxiliary propulsion nozzle, or through a nozzle for exerting a thrust on the aircraft for directional control, or may be used in more than one of these ways.

Another means which may be provided, together with or instead of a heat exchanger, is an air turbine mechanically coupled to the compressor system whereby heat removed from the air flowing to the compressor system is converted to mechanical energy and supplied in that form to the compressor system for conversion to propulsive thrust, and means for rendering the air turbine inoperative as a heat removing means in selected operating conditions.

The removal of heat from the air is more helpful than merely injecting a coolant fluid into the air stream, because such injecting increases the total mass flow that the compressor has to handle.

If there are both an air turbine and a heat exchanger, either may be upstream of the other. If the air turbine is upstream, it extracts more energy for driving the compressor than if it were downstream. If the air turbine is downstream, the heat exchanger operates more efficiently, and the air turbine may be made of less heat-resistant materials.

The accompanying drawings, which are diagrammatic and not to scale, show various examples of engines according to the present invention. In these drawings:

FIGURE 1 is a longitudinal section of one form of jet propulsion gas turbine engine provided with a heat exchanger;

FIGURE 2 is an end view of the heat exchanger of FIGURE 1;

FIGURE 3 is a longitudinal section of another form of jet propulsion gas turbine engine provided with a front air turbine and heat exchanger and an axially movable sleeve for masking the air turbine and heat exchanger from the incoming air; and FIGURES 4 to 7 show details of four other arrangements.

The turbojet engine shown in FIGURES 1 and 2 comprises a forwardly-facing air intake duct 10 including a subsonic diffuser section 11 and provided with a spiked centre-body 12, low pressure and high pressure multi-stage axial flow rotary compressors 13, 14 arranged to be driven respectively by high pressure and low pressure turbines 15, 16, a can-annular combustor 17 arranged to heat the air compressed by the high pressure compressor 14 and to deliver it to the turbine 15, a reheat combustor 18 which includes a fuel injector 19 and flame stabilisers 20 for reheating the turbine exhaust gases in the jet pipe 21, and a convergent-divergent propulsion nozzle 22a, 22b, through which the exhaust gases are discharged to atmosphere to provide a propulsive jet. The primary convergent nozzle 22a has its effective area varied by an axially movable centre body 35 controlled by a ram 38, to which operating fluid is fed by pipes 39.

The engine is designed to propel an aircraft or other aerial body throughout the subsonic speed range and into the supersonic speed range for flight at speeds in excess of, say, Mach 4. At such speeds, cooling of the air between the intake and the compressor improves the thermodynamic efficiency, and hence the compression ratio, of the compressor to a significant extent. Moreover such parts as the stator and rotor blading 23, 24 of the compressors 13, 14 may require protection from the high temperature of the air in the intake duct 10 at speeds in excess of, say, Mach 2.5. Cooling of the air is achieved by locating a multi-duct heat exchanger 26 in the intake duct upstream of the low pressure compressor 13, and causing coolant fluid to flow through the ducts 27 (FIGURE 2) so as to abstract heat from the air passing through the spaces 28 between the ducts 27 on its way to the compressor 13. The location of the heat exchanger in the diffuser section 11 of the intake duct where the air flow is sonic or subsonic allows the heat exchanger to function properly.

The coolant fluid is preferably combustible, and preferably one which is gaseous at normal temperature and pressure, but is stored in a reservoir 30 in liquid state. Examples of such coolants are hydrogen and methane. Alternatively water may be used or solid carbon dioxide. The coolant is fed under control of a valve 31 from the reservoir 30 by means of a pump 32. After passing through the heat transfer ducts 27 and absorbing heat from the air flowing through the spaces 28, the heated coolant—now vapourised hydrogen or methane, or steam—reaches a collector tank 33, whence it may be conveyed by an outlet pipe 34 for injection into the engine working fluid downstream of the compressor 14. The heated coolant may be injected into the primary combustor 17 as indicated at 34a or into the reheat combustor 18, as indicated at 34b or into the jet pipe downstream thereof, as indicated at 34c. Such injection increases the mass flow and temperature of the propulsive jet and hence the fuel requirements for engine combustion may be correspondingly reduced.

At 34c the coolant is shown as being injected into the jet pipe 21 from the flame stabilisers of the reheat combustor. This promotes mixing of unburnt air and burning fuel.

Alternatively the coolant may be used in an auxiliary nozzle as shown at 36 in FIGURE 3, described below.

At speeds below about Mach 2.5 it is not necessary to remove heat from the air, and so that heat exchanger is rendered ineffective by shutting the valve 31 and stopping the pump 32, thus halting the flow of coolant.

The engine shown in FIGURE 3 comprises an air intake duct 40 including a spiked centre body 41, a multi-stage axial flow rotary compressor 42, a can-annular combustor 43, a turbine 44, a reheat combustor 45, and a convergent-divergent propulsion nozzle 46a, 46b. The engine is provided with a heat exchanger 47 and an air turbine 48, both located between the air intake and the compressor 42. The gas turbine 44, compressor 42, and air turbine 48 are all mounted on a shaft 49, the forward end of which is supported through a bearing on the tail of the centre body 41. Radial vanes 50 support the centre body from the engine casing 51. The air turbine 48 is shown diagrammatically with only a single stage, but in practice it may be made with several stages.

A suitable fluid coolant stored in a reservoir 52 is fed to the heat exchanger 47 by a pump 53, the coolant entering the heat exchanger by a pipe 54 and leaving by a pipe 55, whence it is conveyed by a pipe 56 to a point of use. A valve 57 controls the flow of coolant to the pump 53.

In FIGURE 3, the point of use is shown as an auxiliary propulsion nozzle 36 which is located adjacent to the main nozzle and which discharges coolant without any addition of air for combustion. This nozzle has an axially-adjustable centre body 37. One or more similar nozzles at the wing tips and nose and tail of the aircraft may be used to provide thrusts for directional control. Alternatively, the coolant fluid may be used as shown at 34a, 34b, or 34c in FIGURE 1.

Behind the centre body 41 is located an axially movable sleeve 60 for masking the air turbine and heat exchanger from the air in the intake duct when removal of heat is not required. This sleeve is shown in FIGURE 3 in its upstream or masking position, and the air in the intake duct is then constrained to bypass the air turbine and pre-cooler, passing inwards behind these members to reach the compressor 42.

The downstream end portion of the sleeve 60 is formed with two opposite axially-extending slots through which pass the coolant pipes 54, 55, and on its outer surface the upstream end portion of the sleeve is provided with two opposite axially-extending racks arranged to be engaged by drive pinions 61, which together with their driving shafts 62 are housed in the support vanes 50. By rotation of the pinions 61, the sleeve is movable between its masking position as shown and its downstream position, in which its rear surface 63 seals against an annular section 64 of the engine casing and its front end is spaced from the centre body to define therewith an annular inlet leading downstream to the air turbine and heat exchanger. In this downstream position of the sleeve, the air in the intake duct is directed to pass axially through the sleeve, the air turbine and the heat exchanger and thence to the compressor 42. The axial slots in the sleeve which receive the coolant pipes 54, 55 are of sufficient length to permit the required axial movement of the sleeve past those pipes. The sleeve is supported on ball bearings interposed between it and an annular ring 65 mounted on the radially inner ends of the vanes 50, the upstream end of the ring 65 being located so as not to interfere with the air flow into the sleeve when the latter is in its downstream position.

In operation, for speeds up to about Mach 2.5, when removal of heat from the air is not essential, the sleeve is maintained in its upstream position so that the air flow to the compressor by-passes the air turbine and the heat exchanger. When air cooling is desired, the sleeve is driven through the rack and pinion mechanism to its downstream position so that the air in the subsonic diffuser section of the intake duct is forced to pass firstly through the air turbine, thereby experiencing a pressure drop and abstraction of heat which is converted into mechanical energy and supplied to the compressor system, and secondly through the heat exchanger for abstraction of heat by the coolant. After thus being cooled twice, the air enters the compressor at a suitable temperature.

Conventional means for supplying fuel continuously to the combustion system are indicated at X in FIGURE 1 and at Y in FIGURE 3.

In a modification, the masking sleeve including its driving mechanism and supporting ring is omitted, and there is, as shown in FIGURE 4, a clutch 66 between the air turbine 48 and the engine shaft 49, operated by a control connection 67 passing through the centre body 41. Alternatively the air turbine has no clutch but is provided with adjustable blades which can be "feathered" or can be reversed to function as compressor blades. FIGURE 5 indicates how the blades 68 of the air turbine may each be mounted to turn on a hub 69, and be adjusted by a grooved sleeve 70, which is slid axially on the shaft 49 by means, e.g. a ram not shown, and which engages crank pins 71 on the inner ends of the blades.

Alternatively the air turbine may be provided with means for permitting it to free-wheel.

FIGURE 6 shows a housing 72 containing a clutch or freewheel interposed between the hot gas turbine 44 and the engine shaft 49.

In a further modification, the air turbine 48 when operative is arranged to provide the whole driving torque to the compressor, the arrangement being such that, as the air turbine takes over driving the compressor, the drive from the hot gas turbine 44 diminishes, the latter becoming uncoupled from the compressor or by-passed by the hot gases.

FIGURE 7 shows a bypass duct 73 around the turbine 44, and a sleeve 74 which is axially movable by means 75 between a downstream position, directing gas to the turbine 44 (see the upper half of FIGURE 7), and an upstream position, directing gas through the bypass duct 73 (see the lower half of FIGURE 7).

The arrangements for uncoupling or bypassing may be similar to those described and shown in relation to the air turbine in FIGURES 3 and 4. Alternatively the pitch of the gas turbine blades may be varied, by mechanism similar to that shown in FIGURE 5.

The air turbine and heat exchanger may be brought into and out of operation simultaneously, or at different phases of acceleration and deceleration of the aircraft.

I claim:

1. An air breathing jet propulsion engine comprising in connected flow sequence a ram air intake adapted to receive air at speeds considerably exceeding Mach 1, a multi-stage axial flow rotary compressor system, a primary combustion system, means for supplying fuel continuously to the combustion system to burn with the air which reaches the combustion system from the compressor system, a turbine system arranged to drive the compressor system, a jet pipe, and a propulsion nozzle, and including means operative during operation of the turbine system to drive the compressor system for removing heat from the air flowing from the air intake to the compressor system and for generating thrust from the removed heat, and means to render said heat removing means inoperative in selected operating conditions.

2. An engine according to claim 1, including a heat exchanger in which air flowing from the air intake to the compressor system optionally passes in heat exchange relation with a coolant fluid, and means for expanding the heated coolant fluid in a jet propulsion nozzle.

3. An engine according to claim 1, including a heat exchanger in which air flowing from the air intake to the compressor system optionally passes in heat exchange relation with a coolant fluid, and means for burning the heated coolant fluid and expanding the combustion products thereof in a jet propulsion nozzle.

4. An engine according to claim 1, including a heat exchanger in which air flowing from the air intake to the compressor system optionally passes in heat exchange relation with a coolant fluid, and means for injecting the heated coolant fluid into the working fluid stream of the engine downstream of the compressor system.

5. An engine according to claim 1, including a heat exchanger in which air flowing from the air intake to the compressor system optionally passes in heat exchange relation with a coolant fluid, and means for burning the heated coolant fluid in the primary combustion system.

6. An air breathing jet propulsion engine comprising in connected flow sequence a ram air intake, a multi-stage axial flow rotary compressor system, a primary combustion system, a turbine system arranged to drive the compressor system, a jet pipe, and a propulsion nozzle, including optionally operable means for removing heat from the air flowing from the air intake to the compressor system and for generating thrust from the removed heat, and an air turbine between the air intake and the compressor system mechanically coupled to the compressor system, whereby heat removed from the air flowing to the compressor system is converted to mechanical energy and supplied in that form to the compressor system for conversion to propulsive thrust, and means for rendering the air turbine inoperative as a heat removing means in selected operating conditions.

7. An engine according to claim 6, including means for disconnecting the drive between the engine turbine system and the compressor system.

8. An engine according to claim 6, including means for changing the pitch of blades of the engine turbine system.

9. An engine according to claim 6, including means for disconnecting the drive between the air turbine and the compressor system.

10. An engine according to claim 6, including means for feathering the blades of the air turbine.

11. An air breathing jet propulsion engine comprising in connected flow sequence a ram air intake, a multi-stage axial flow rotary compressor system, a primary combustion system, a turbine system arranged to drive the compressor system, a jet pipe, and a propulsion nozzle, and an air turbine between the air intake and the compressor system mechanically coupled to the compressor system, whereby heat removed from the air flowing to the compressor system is converted to mechanical energy and supplied in that form to the compressor system for conversion to propulsive thrust, and means for rendering the air turbine inoperative as a heat removing means in selected operating conditions.

References Cited by the Examiner

UNITED STATES PATENTS

| | | | |
|---|---|---|---|
| 2,074,803 | 3/37 | Noble | 230—182 |
| 2,468,157 | 4/49 | Barlow et al. | 123—119 |
| 2,602,289 | 7/52 | Anxionnaz et al. | 60—35.6 |
| 2,952,973 | 9/60 | Hall et al. | 60—39.18 |
| 3,040,519 | 6/62 | Rae | 60—39.17 |

MARK NEWMAN, *Primary Examiner.*

SAMUEL LEVINE, *Examiner.*